US009707813B2

(12) United States Patent
Randle

(10) Patent No.: US 9,707,813 B2
(45) Date of Patent: Jul. 18, 2017

(54) SUSPENSION SYSTEM

(71) Applicant: McLaren Automotive Limited, Woking (GB)

(72) Inventor: Steven James Randle, Woking (GB)

(73) Assignee: McLaren Automotive Limited, Woking (GB)

( * ) Notice: Subject to any disclaimer, the term of this patent is extended or adjusted under 35 U.S.C. 154(b) by 0 days.

(21) Appl. No.: 14/776,548

(22) PCT Filed: Mar. 17, 2014

(86) PCT No.: PCT/EP2014/055349
§ 371 (c)(1),
(2) Date: Sep. 14, 2015

(87) PCT Pub. No.: WO2014/140382
PCT Pub. Date: Sep. 18, 2014

(65) Prior Publication Data
US 2016/0039260 A1    Feb. 11, 2016

(30) Foreign Application Priority Data
Mar. 15, 2013  (GB) .................................. 1304819.4

(51) Int. Cl.
*B60G 3/26*     (2006.01)
*B62D 17/00*    (2006.01)
*B60G 3/20*     (2006.01)

(52) U.S. Cl.
CPC ................. *B60G 3/26* (2013.01); *B60G 3/20* (2013.01); *B62D 17/00* (2013.01); *B60G 2200/46* (2013.01); *B60G 2206/50* (2013.01)

(58) Field of Classification Search
CPC ........ B60G 3/20; B60G 3/26; B60G 2200/46; B60G 2206/50; B62D 17/00
See application file for complete search history.

(56) References Cited

U.S. PATENT DOCUMENTS

| 3,497,233 A | 2/1970 | Bolaski, Jr. |
| 6,688,620 B2 * | 2/2004 | Serra ...................... B60G 3/265 |
| | | 280/124.135 |

(Continued)

FOREIGN PATENT DOCUMENTS

| EP | 1247663 A1 | 10/2002 |
| FR | 2872452 A1 | 1/2006 |

OTHER PUBLICATIONS

D. Malicky, "Load-Sensitive Camber Control Mechanism for a Vehicle Suspension 1992", http://www.malicky.com/davidm/projects/projects.html.

(Continued)

*Primary Examiner* — Paul N Dickson
*Assistant Examiner* — Timothy Wilhelm
(74) *Attorney, Agent, or Firm* — Dergosits & Noah, LLP

(57) ABSTRACT

A vehicle having a hub carrier coupled to a body of the vehicle by a camber mechanism, the vehicle having first and second mounting points by means of which the camber mechanism is coupled to the body of the vehicle, wherein: (i) the camber mechanism comprises: a first wing attached to the first mounting point by a first rotationally free joint; a second wing attached to the second mounting point by a second rotationally free joint and attached to the first wing by an inter-wing joint that permits relative motion of the first and second wings; and a tie link attached by a third rotationally free joint to the first wing and running to the vehicle body; (ii) the hub carrier is attached to the first wing by a first hub carrier joint permitting relative rotation of the first wing and the hub carrier about only a single axis, which axis substantially intersects a camber axis; (iii) the hub carrier is attached to the second wing by a second hub carrier joint permitting relative rotation of the second wing and the hub carrier about only a single axis, which axis substantially intersects the camber axis; and (iv) the inter-wing joint and (Continued)

the first and second hub carrier joints provide freedom of motion such that the hub carrier can camber relative to the vehicle body about the camber axis.

48 Claims, 5 Drawing Sheets

(56) References Cited

U.S. PATENT DOCUMENTS

| | | | | |
|---|---|---|---|---|
| 6,776,426 B2* | 8/2004 | Deal | ................ | B60G 3/20 |
| | | | | 280/124.138 |
| 7,222,863 B2* | 5/2007 | Deal | ................ | B60G 3/01 |
| | | | | 280/124.135 |
| 7,712,748 B2* | 5/2010 | Deal | ................ | B60G 3/01 |
| | | | | 280/124.135 |
| 7,793,946 B2* | 9/2010 | Vaxelaire | ................ | B60G 3/26 |
| | | | | 280/5.521 |
| 8,424,880 B2* | 4/2013 | Horiguchi | ................ | B60G 7/006 |
| | | | | 280/5.521 |
| 8,794,647 B2* | 8/2014 | Moessinger | ................ | B60G 7/008 |
| | | | | 280/124.138 |
| 2003/0011157 A1* | 1/2003 | Aubarede | ................ | B60G 3/26 |
| | | | | 280/86.751 |
| 2008/0111336 A1* | 5/2008 | Aubarede | ................ | B60G 7/008 |
| | | | | 280/124.128 |
| 2011/0095502 A1* | 4/2011 | Dada | ................ | B60G 3/26 |
| | | | | 280/124.127 |

OTHER PUBLICATIONS

International Search Report, dated May 27, 2014, for PCT Application No. PCT/EP2014/055349 filed Mar. 17, 2014.

* cited by examiner

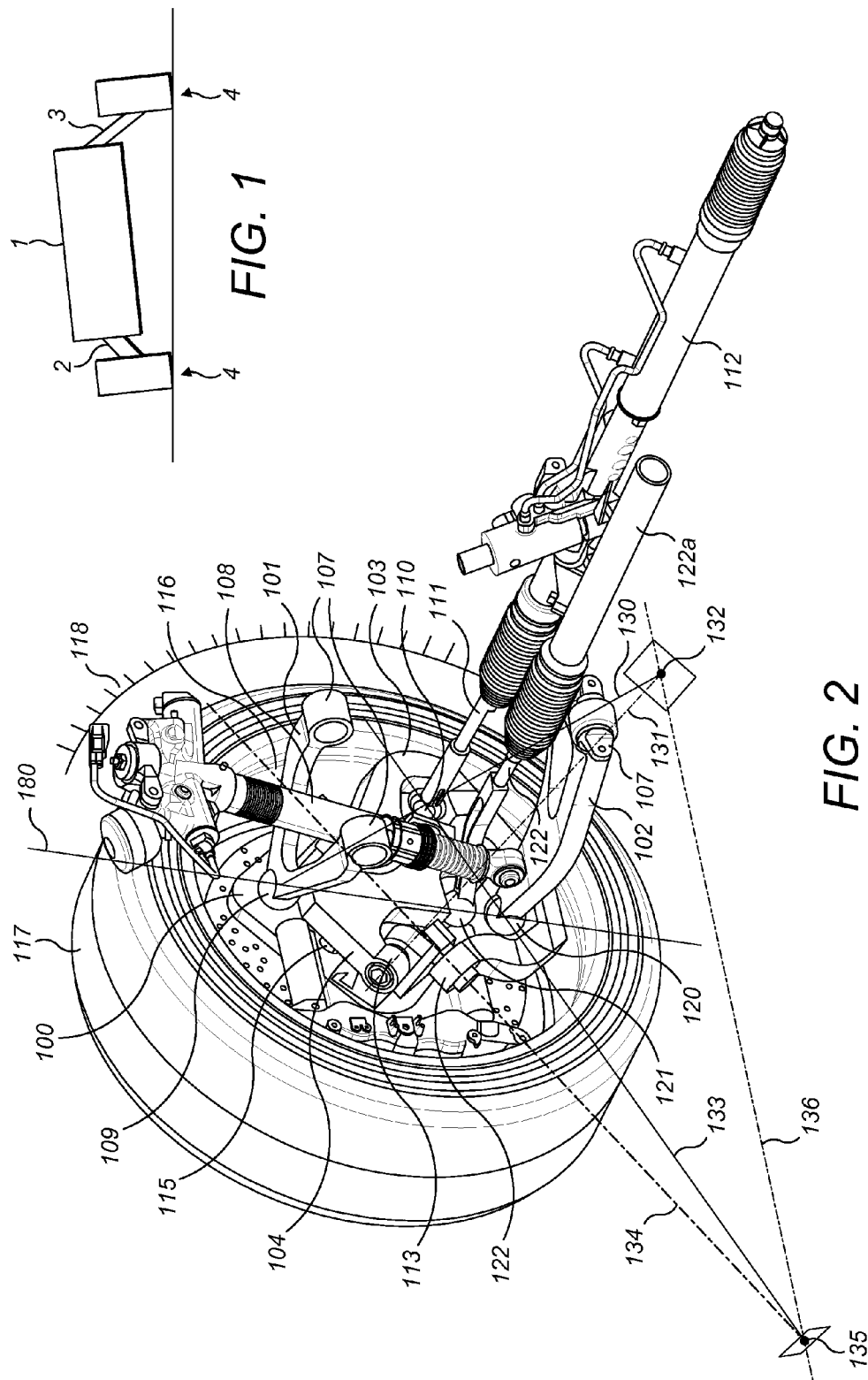

SUSPENSION SYSTEM

CROSS-REFERENCE

This is a United States national phase application of PCT/EP2014/055349 filed Mar. 17, 2014 entitled Suspension System, which claims priority from United Kingdom Application No, 1304819.4 filed Mar. 15, 2013 entitled Suspension System, the entire disclosure of which is incorporated herein by reference.

TECHNICAL FIELD

This invention relates to a suspension system for a vehicle.

BACKGROUND

The camber angle of a vehicle's wheel is the inclination of the wheel's plane of rotation from a normal to the running surface of the vehicle: for instance the inclination of that plane from vertical when the vehicle is on a horizontal surface. Positive camber is present when the upper part of that plane is outboard of the lower part of that plane: that is when the upper part of the wheel is inclined outwardly from the body of the vehicle. Negative camber is present when the upper part of that plane is inboard of the lower part of that plane: that is when the upper part of the wheel is inclined inwardly towards the body of the vehicle.

In most vehicles the camber angle of a wheel might vary slightly with suspension travel in bump or rebound and—in the case of a steerable wheel—with steering angle, but is otherwise essentially fixed. This effect can result in a reduction in grip when the vehicle corners. FIG. 1 illustrates a vehicle with essentially fixed camber cornering towards the right of the figure. The body 1 is rolled towards the outside of the corner, compressing the suspension on the outer side 2 of the vehicle and extending the suspension on the inner side 3 of the vehicle. This results in the load of the vehicle being concentrated on the edges 4 of the wheels that are closer to the outer side of the corner. As a result of this effect, and other effects arising from the absence of camber freedom, the vehicle may experience a reduction in grip in the corner.

One way to address this problem is for wheels to be mounted on wishbones of unequal lengths so that as a wheel undergoes bump travel its camber changes significantly. However, because the suspension can travel in bump for reasons other than cornering: for example due to unevenness in the road or due to dive under braking, this linkage between suspension travel and camber can adversely affect other aspects of the vehicle's handling.

It has been suggested that it would be desirable for the wheels of a vehicle to be movable in camber as the vehicle corners, independently of bump travel, with a view to maintaining a more even load across the wheel's periphery and thereby improving grip. This would require the wheels on the outer side of the corner to reduce in camber (i.e. towards increasing negative camber) and the wheels on the inner side of the corner to increase in camber (i.e. towards increasing positive camber) as the vehicle enters the corner. Several ways of achieving this have been proposed. In U.S. Pat. No. 3,497,233, lower suspension control arms are mounted on pivoted drop links, and roll of the vehicle body is transmitted to those drop links to cause the camber of the wheels to alter. In the "Load-Sensitive Camber Control Mechanism for a Vehicle Suspension 1992" described at <http://www.malicky.com/davidm/projects/projects.html>, a wheel is arranged on a linkage such that the wheel has freedom to move in camber about a virtual pivot point. Because that point is below the road surface the lateral cornering force on the contact patch of the wheel causes the wheel to move in negative camber when on the outer side of a corner and vice versa. In U.S. Pat. No. 6,776,426, a wheel carrier is mounted on a trapezoidal element that can rotate relative to the body of the vehicle about a substantially vertical axis. The configuration of the trapezoid provides the wheel with a virtual pivot point for camber that can be below the ground.

For a suspension system to be usable in a real-world vehicle it should preferably meet a host of practical requirements. For example, it should not occupy too much space either in the wheelarch or in the remainder of the vehicle; it should allow the desired range of motion of the wheel in bump/rebound, steer and, if desired, camber without parts of the suspension clashing with each other; and it should leave room for the other components that are to be associated with the wheel such as a brake rotor, a brake caliper, control lines and sensors. In practice it has proved difficult to satisfy some or all of these requirements with some prior designs of suspension that offer freedom of movement in camber.

SUMMARY

According to the present invention there is provided a vehicle having a hub carrier coupled to a body of the vehicle by a camber mechanism, the vehicle having first and second mounting points by means of which the camber mechanism is coupled to the body of the vehicle, wherein: (i) the camber mechanism comprises: a first wing attached to the first mounting point by a first rotationally free joint; a second wing attached to the second mounting point by a second rotationally free joint and attached to the first wing by an inter-wing joint that permits relative motion of the first and second wings; and a tie link attached by a third rotationally free joint to the first wing and running to the vehicle body; (ii) the hub carrier is attached to the first wing by a first hub carrier joint permitting relative rotation of the first wing and the hub carrier about only a single axis, which axis substantially intersects a camber axis; (iii) the hub carrier is attached to the second wing by a second hub carrier joint permitting relative rotation of the second wing and the hub carrier about only a single axis, which axis substantially intersects the camber axis; and (iv) the inter-wing joint and the first and second hub carrier joints provide freedom of motion such that the hub carrier can camber relative to the vehicle body about the camber axis.

The inter-wing joint and the first and second hub carrier joints may provide freedom of motion such that the only permitted motions of the hub carrier relative to the first and second mounting points are: (a) cambering relative to the vehicle body about the camber axis; and optionally (b) steering relative to the vehicle body about an axis running between the first and second mounting points.

The first wing may be able to rotate relative to the first mounting point about a first wing rotation axis passing substantially through the first rotationally free joint and the zone of closest approach between the camber axis and the axis of the first hub carrier joint.

The first rotationally free joint may be defined by multilinks.

The first wing rotation axis may pass substantially through the third rotationally free joint.

The second wing may be able to rotate relative to the second mounting point about a second wing rotation axis passing substantially through the second rotationally free joint and the zone of closest approach between the axis of the second hub carrier joint and the camber axis.

The inter-wing joint may be located adjacent an axis joining (a) the point of closest approach of the first wing axis and the second wing axis and (b) the point of closest approach of the axis of the first hub carrier joint and the axis of the second hub carrier joint.

A part of the tie rod may be translationally fast with the body of the vehicle. A part of the tie rod may be translationally fast with a steering mechanism whereby it can be moved relative to the body of the vehicle in response to steering inputs.

The first rotationally free joint may be a spherical joint. The second rotationally free joint may be a spherical joint.

The vehicle may comprise a suspension mechanism whereby the vehicle can be suspended from the first and second mounting points in such a way as to permit bump travel of the camber mechanism relative to the body of the vehicle. It may be possible to suspend the vehicle from at least one of the wings by means of at least two multilinks.

The first and second hub carrier joints may be cylindrical joints. The inter-wing joint may be a spherical joint.

The camber mechanism may present no resistance to motion of the hub carrier in camber relative to the body of the vehicle from its neutral position.

The vehicle may comprise a wheel attached to the hub carrier. The camber axis is located below the running surface of the wheel.

The camber mechanism may be such that the wheel is able to move in camber substantially independently of bump and steer during normal motion of the vehicle.

The vehicle may comprise a second hub carrier coupled to the body of the vehicle in a manner set out above, the first and second hub carriers being interlinked so as to coordinate their motion in camber.

The first and second hub carriers may be interlinked by a camber control mechanism connected between one wing attached to one of the hub carriers and one wing attached to the other of the hub carriers. The camber control mechanism may be attached to each of the said wings at a respective point substantially on an axis between the respective first and second mounting points. The camber control mechanism may be a strut rigid for transmission of force axially along the strut. The camber control mechanism may be resiliently flexible in response to bump motion of each hub carrier. The camber control mechanism may present no resistance to coordinated motion of the hub carriers in camber relative to the body of the vehicle from their neutral positions. The camber control mechanism may present resistance to camber, which resistance is in relation to its velocity relative to the vehicle body. The camber control mechanism may be capable of urging the wheel to alter its camber position.

The axis of the first hub carrier joint and the axis of the second hub carrier joint may be coplanar.

At least one of the first and second hub carrier joints may be constituted by a hinge structure that in itself resists relative axial translation of the parts coupled by the joint in only one direction.

According to a second aspect of the present invention there is provided a vehicle having a hub carrier coupled to a body of the vehicle by a camber mechanism, the vehicle having first and second mounting points by means of which the camber mechanism is coupled to the body of the vehicle, wherein the camber mechanism comprises: a first wing rotatably attached to the first mounting point; a second wing rotatably attached to the second mounting point; and a first hub carrier joint attaching the hub carrier to the first wing, the first hub carrier joint permitting relative rotation of the first wing and the hub carrier about only a single axis, which axis substantially intersects a camber axis; a second hub carrier joint attaching the hub carrier to the second wing, the second hub carrier joint permitting relative rotation of the second wing and the hub carrier about only a single axis, which axis substantially intersects the camber axis; and an inter-wing joint coupling the first wing and the second wing together; wherein one of the first and second mounting points is located above the other, and the inter-wing joint is configured such that relative motion of the first and second wings imposes a velocity ratio between motions at the first and second mounting points whereby the hub carrier can camber relative to the vehicle body about the camber axis.

The vehicle may comprise a wheel attached to the hub carrier and wherein the camber axis is located below the running surface of the wheel.

The first and second hub carrier joints may be cylindrical joints.

The inter-wing joint may be a spherical joint attached on the one hand to the first wing and on the other hand to the second wing.

The first wing may be rotatably mounted to the first mounting point by a spherical joint. The second wing may be rotatably mounted to the second mounting point by a spherical joint.

The first mounting point and/or the second mounting point may be linked to the body of the vehicle by respective wishbones.

The vehicle may comprise a linkage extending between at least one of the wings and the body of the vehicle for constraining the motion of the wheel in camber.

The vehicle may comprise a second hub carrier coupled to the body of the vehicle in the manner set out above, the first and second hub carriers being interlinked so as to coordinate their motion in camber.

The first and second hub carriers may be interlinked by a camber control mechanism connected between one wing attached to one of the hub carriers and one wing attached to the other of the hub carriers.

According to a third aspect of the present invention there is provided a vehicle having a hub carrier coupled to a body of the vehicle by a mechanism, the vehicle having first and second mounting points by means of which the mechanism is coupled to the body of the vehicle, wherein the mechanism comprises: a first wing rotatably attached to the first mounting point; a second wing rotatably attached to the second mounting point; and a first hub carrier joint attaching the hub carrier to the first wing, the first hub carrier joint permitting relative rotation of the first wing and the hub carrier about only a single first axis; a second hub carrier joint attaching the hub carrier to the second wing, the second hub carrier joint permitting relative rotation of the second wing and the hub carrier about only a single second axis, the first and second axes deviating from each other by at least 45°; and an inter-wing joint coupling the first wing and the second wing together; wherein one of the first and second mounting points is located above the other, the inter-wing joint is configured such that relative motion of the first and second wings imposes a velocity ratio between motions at the first and second mounting points, and the first and second hub carrier joints are cylindrical joints.

The body of the vehicle may be suspended from the mechanism by the first and second mounting points.

The first and second mounting points may be capable of moving relative to the body of the vehicle in bump.

The hub carrier may be capable of moving in camber relative to the body of the vehicle by virtue of relative motion of the wings.

According to a fourth aspect of the present invention there is provided a method of assembling a vehicle as claimed in any preceding claim, the method comprising interengaging each wing with the hub carrier by a linear motion along the axis of the joint between the respective wing and the hub carrier. Each joint between the hub carrier and the wings may be constituted by one or more stub pins extending from one of the hub carrier and the wings coaxially with the respective joint. The other of the hub carrier and the wings may carry a part for engaging each such pin to form the joint.

According to a fifth aspect of the present invention there is provided a vehicle having a driven running wheel coupled to a body of the vehicle by a suspension mechanism, the suspension mechanism being configured to permit the wheel to move freely in camber and having at least one of the following characteristics: (i) that the wheel's hub centre is at its most forward position substantially at the centre of camber motion; and (ii) that the wheel's contact patch centre is at its most rearward position substantially at the centre of camber motion.

The suspension mechanism may have both characteristics (i) and (ii). The suspension mechanism may have a cub carrier that carries the wheel. Characteristic (ii) may be interpreted as the lowest part of the wheel carrier having its most rearward position substantially at the centre of camber motion. The most forward and most rearward positions are relative to the body of the vehicle: i.e. in the vehicle's X axis.

The phrase "substantially at the centre of camber" may be interpreted as signifying that the relevant behaviour is at a camber position where the handling of the vehicle is substantially neutral to camber, e.g. within 1.0, 1.5, 2.0 or 2.5 degrees of camber from either or both of (a) the centre of the wheel's camber motion and (b) the wheel's default camber position. The wheel's default camber position may be the position it adopts when the vehicle is sitting not in motion on a level surface. The wheel's default camber position may be the position it adopts when the vehicle is sitting not in motion on a level surface and the opposite wheel has the same camber angle.

The wheel's hub centre may be a local maximum of its forward position substantially at the centre of camber motion. The wheel's hub centre may be at an absolute maximum of its forward position substantially at the centre of camber motion. The wheel's hub centre may be at the said maximum within 2.5 degrees of the centre of camber motion. The wheel's hub centre may be at the said maximum at the wheel's default camber position.

The wheel's contact patch centre may be at a local maximum of its rearward position substantially at the centre of camber motion. The wheel's contact patch centre may be at an absolute maximum of its rearward position substantially at the centre of camber motion. The wheel's contact patch centre may be at the said maximum within 2.5 degrees of the centre of camber motion.

The vehicle may comprise a drive source such as an engine and/or a motor arranged to drive the driven wheel. The drive source may be coupled to the wheel by a drive shaft. The drive shaft may pass through an element of the suspension mechanism by which the vehicle is supported relative to the wheel, and that moves relative to the body of the vehicle and to the wheel support when the wheel support undergoes camber motion. The wheel support may be coupled to that member on either side of the drive shaft, e.g. by a revolute joint.

The wheel's contact patch centre may be the geometric centre of the contact patch when the vehicle is on a flat horizontal surface.

The wheel's hub centre may move in the vehicle's X axis (i.e. forwards and/or rearwards) as a function of camber motion of the wheel. The wheel's contact patch centre may move in the vehicle's X axis (i.e. forwards and/or rearwards) as a function of camber motion of the wheel.

BRIEF DESCRIPTION OF THE DRAWINGS

The present invention will now be described by way of example with reference to the accompanying drawings. In the drawings:

FIG. 1 illustrates characteristics of a vehicle in cornering.

FIG. 2 is a view of a suspension system from inboard and ahead of a wheel.

DETAILED DESCRIPTION

Figure 3:
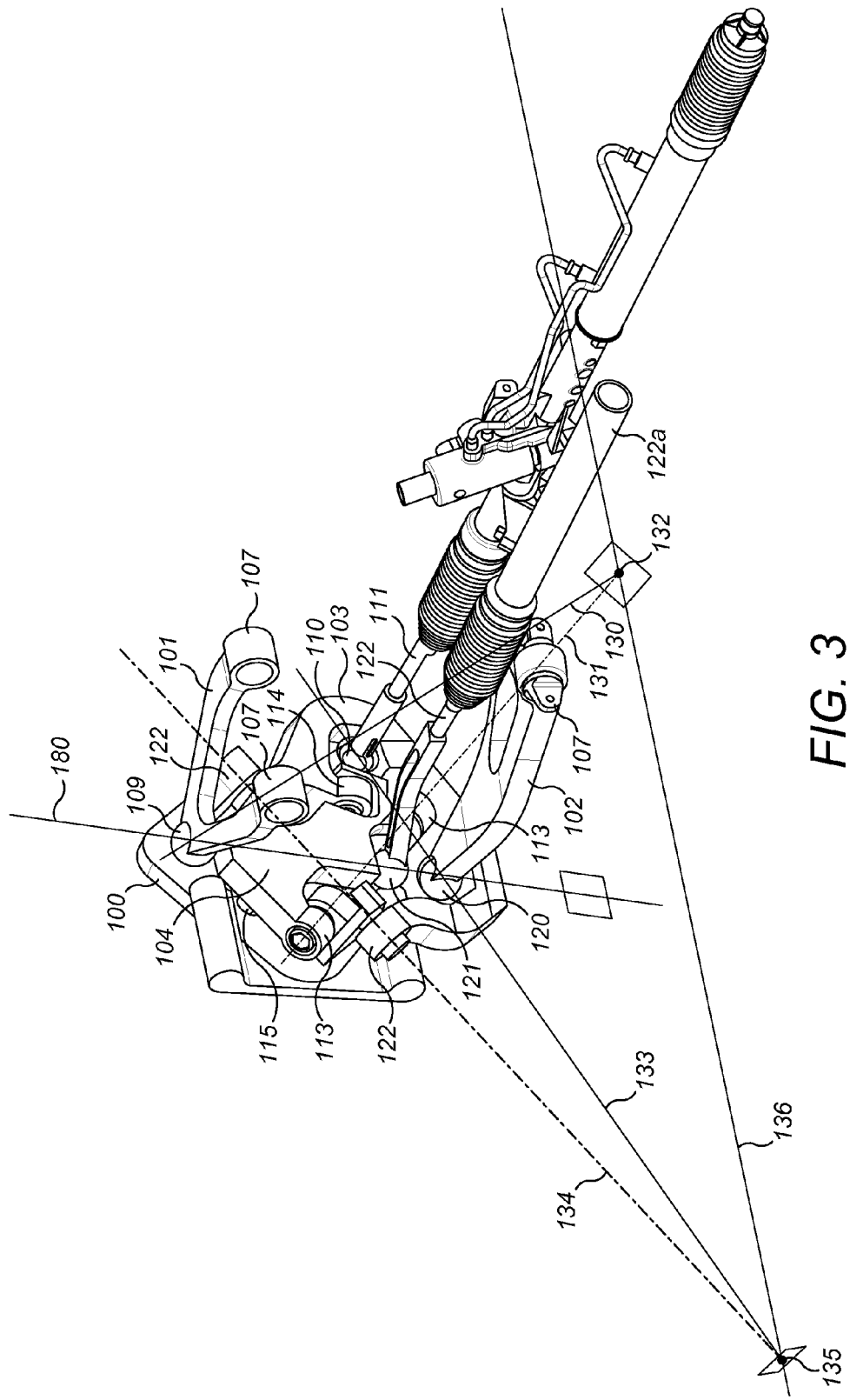
FIG. 3 is a view similar to that of FIG. 2 but with the wheel, brake rotor, vehicle body and suspension damper omitted for clarity.

In the suspension system of FIGS. 2 and 3 a wheel upright or hub carrier 100 carries a wheel bearing 115 about which the wheel can rotate. The wheel itself comprises a hub 116 which is attached to the bearing, and a tyre 117 which encircles the hub.

The wheel bearing 115 is coupled to the vehicle body (part of which is indicated at 118) of the vehicle by a cambering mechanism. The cambering mechanism sits between the wheel upright 100 and a pair of suspension arms or wishbones 101, 102 that suspend the body of the vehicle from the wheel. The cambering mechanism comprises a pair of flexibly interlinked rigid wings 103, 104 which are arranged in such a way that: (a) the wheel has freedom to pivot in camber substantially independently of either steer position or suspension deflection in bump or rebound; and (b) the axis of that pivoting motion is located below the running surface of the wheel and is directed substantially parallel with the rotation plane of the wheel.

Because the axis of the pivoting motion is below the running surface of the wheel, a lateral force on the wheel at the running surface in a direction away from the centreline of the vehicle will urge the wheel towards positive camber, and a lateral force on the wheel at the running surface in a direction towards the centreline of the vehicle will urge the wheel towards negative camber. So when the vehicle is in a corner the cornering forces on the contact patch of the wheel will urge the inner wheel towards positive camber and the outer wheel towards negative camber. This can be advantageous for grip and handling because it can counteract the tendency of the wheels to tilt under cornering roll in such a way as to cause the contact patch not to be centred laterally on the periphery of the wheel. The degree to which this effect influences the camber of a wheel will depend, among other factors, on (i) the force vector applied to the wheel through the contact patch, (ii) the location of the camber axis, which is determined by the configuration of the suspension/camber mechanism, and (iii) any damping or assistance applied to the camber motion through or by the suspension/camber mechanism. In a typical vehicle the outer wheel can adopt a positive camber angle during hard cornering. It is advantageous if the suspension/camber mechanism is arranged so that during cornering the outside wheel achieves zero or even negative camber. For example, the mechanism may be configured on a vehicle such that when the vehicle is cornering with maximum lateral acceleration on a flat horizontal surface the outside wheel can reach a negative camber angle of greater than 2° and more preferably greater than 3°. Preferably in that same situation the outside wheel can achieve a negative camber angle of no greater than 5°.

The wheel may be free to move under camber during normal driving of the vehicle simply under the influence of the force at the contact patch, or at the contact patches of wheels that are linked in camber. That motion may be damped or sprung as desired. Alternatively, or in addition, the vehicle may be capable of driving its wheels to move in camber, for example by means of a hydraulic actuator attached to the inboard end of a camber link 122. The driving of a wheel to move in camber may be governed by a predetermined control algorithm. For example, the algorithm may be defined so as to apply damping to the camber motion in response to the dynamic condition of the vehicle. The algorithm may be stored in non-transient form as a set of instructions for execution by a data processor. The data processor could receive inputs indicating the vehicle's dynamic state: for example any one or more of its longitudinal acceleration, its lateral acceleration, its steering position, its throttle position and its engine torque. In dependence on those inputs the data processor executing the instructions could produce outputs that drive one or more actuators for influencing the camber angle of the wheels.

The suspension system of FIGS. 2 and 3 permits the body of a vehicle to be suspended from a running wheel of the vehicle.

The suspension system shown in the figures comprises a pair of suspension arms or wishbones 101, 102. Each wishbone is mounted to the body of the vehicle by a respective revolute joint 107 at its inboard end. Those axes are preferably substantially parallel with the longitudinal (X) axis of the vehicle but they could deviate significantly from it. Other mechanisms than coupled suspension arms could be used to provide bump travel: for example multilinks or vertically sliding struts; and if the vehicle were not to have any bump travel then suspension arms could be omitted and the wings 103, 104 could be attached to appropriate mounting points directly on the body of the vehicle that provide sufficient freedom (e.g. some vertical translation freedom at at least one of the mounts) that the desired camber motion is not inhibited.

The motion of the suspension arms relative to the body of the vehicle can be moderated by means such as springs and/or dampers in the normal way. For example, a damper 108 (FIG. 2) with a coil spring over it could extend between one of the suspension arms and the body of the vehicle. Conveniently the damper extends to the lower arm since that can provide more room for it to be accommodated in a wheelarch of the vehicle.

The upper wing 104 is a rigid body which is shaped to provide mountings to other parts, as will be described below, and to fit among the other components of the suspension without fouling them as the suspension moves through its range of motion.

A first mounting of the upper wing is joint 109 between it and the upper suspension arm 101. The joint 109 is conveniently a spherical joint. The joint 109 may be located at the outboard end of the upper suspension arm. The joint 109 may be located at the uppermost end of the upper wing. Conveniently the joint 109 can be constituted by an extension of the upper wing being located in a spherical socket of the upper suspension arm.

A second mounting of the upper wing is joint 121 between it and a camber control rod 122. The joint 121 is conveniently a spherical joint. The joint 121 may be located at the outermost end of the camber control rod 121. Camber control rod 122 is coupled at its inboard end to a camber control mechanism 122a which will be described in more detail below. This mechanism may constrain the inboard end of the camber control rod so that it moves substantially linearly in a lateral direction with respect to the vehicle. The camber control rod can conveniently be connected to the camber control mechanism by a spherical joint such as a ball joint at its inboard end. Alternatively, the camber control rod could be flexible.

A third mounting of the upper wing is joint 113 between it and the wheel upright 100. The joint 113 permits relative rotation of the upper wing and the wheel upright. It may be a revolute joint or a cylindrical joint. The way in which the joint 113 is presented can depend on packaging considerations, but in one convenient embodiment it can be constituted by two separate spaced-apart revolute or cylindrical attachment points, as shown in the figures, one on either side of the lower wing. Alternatively, it could be constituted by a single attachment point.

A fourth mounting of the upper wing is joint 114 between it and the lower wing. (See FIG. 3). The nature of this joint will be discussed in more detail below.

The lower wing 103 is a rigid body which is shaped to provide mountings to other parts, as will be described below, and to fit among the other components of the suspension without fouling them as the suspension moves through its range of motion.

A first mounting of the lower wing is joint 120 between it and the lower suspension arm. The joint 120 is conveniently a spherical joint. The joint 120 may be located at the outboard end of the lower suspension arm. The joint 120 may be located at the lowermost end of the lower wing. Conveniently the joint 120 can be constituted by an extension of the lower wing being located in a spherical socket of the lower suspension arm.

A second mounting of the lower wing is joint 110 between it and a steering track rod 111. The joint 110 is conveniently a spherical joint. The joint 110 may be located at the foremost or rearmost end of the lower wing, or elsewhere. The joint 110 may be located at the outermost end of the track rod 111. Track rod 111 is coupled at its inboard end to a steering rack 112 (FIG. 2) or similar device for moving the inboard end of the track rod laterally across the vehicle in response to steering inputs from a driver. Otherwise, the inner end of the track rod is constrained. The track rod can conveniently be connected to the steering rack via a spherical joint such as a ball joint at its inboard end.

A third mounting of the lower wing is joint 122 between it and the wheel upright 100. The joint 122 permits relative rotation of the lower wing and the wheel upright. It may be a revolute joint or a cylindrical joint. The way in which the joint 122 is presented can depend on packaging considerations. It could be constituted by two separate spaced-apart revolute or cylindrical attachment points or by a single attachment point.

A fourth mounting of the lower wing is joint 114 between it and the upper wing, which will be discussed in more detail below.

Conveniently joint 121 is offset in the vehicle's longitudinal direction from joint 110, so that track rod 111 and camber control rod 122 can extend generally laterally with respect to the vehicle without clashing.

In a first embodiment the joints 113 and 122 between the wheel upright and the upper and lower wings are cylindrical joints (thus they permit relative rotation about an axis and translational motion along that axis but resist other forms of motion), and the joint 114 between the upper and lower wings is a spherical joint (thus the parts it interconnects are free to rotate about any axis but cannot translate relative to each other at the joint). The manner in which the camber mechanism provides camber freedom in this first embodiment will now be described.

Suppose that the vehicle's bump travel and steering input are constant. Since the vehicle's bump travel is constant the positions of the mounts 109 and 120 at the outer ends of the suspension arms are constant (although some limited relative movement of them may take place to accommodate camber motion). Since the vehicle's steering input is constant the position of the inboard end of track rod 111 is constant and hence the position of its outer end, at joint 110, is substantially fixed. In this condition, lower suspension mount 120 and steering joint 110 define an axis ("lower wing axis") 133 about which the lower wing is substantially constrained to rotate. The lower wing is configured so that the lower wing axis 133 is coplanar with and not parallel with the rotation axis 134 of the joint 122 between the lower wing and the wheel upright 100. As a result, axes 133 and 134 will intersect at a point 135. The camber axis 136 passes through point 135. A further axis 130 is constructed such that it joins upper suspension mount 109 and another point 132 that lies on the camber axis 136. Joint 113 is configured such that its rotation axis 131, between the upper wing 104 and the wheel upright 100, will intersect the camber axis at point 132.

It is convenient for axes 131 and 134, between the wheel upright and the upper and lower wings respectively, to be significantly offset from each other. For example, they could make an angle of between 70° and 110°, more preferably 80° to 100° to each other when resolved into a plane containing one or both of those axes. Conveniently axes 131 and 134 lie in or substantially in a common plane, although they need not do so.

In this embodiment, if joints 113 and 122 were revolute joints then the system would be fully constrained and no camber motion would be provided. However, since joints 113 and 122 permit relative translation of the wheel upright 100 and the upper and lower wings 104, 103 along axes 131 and 134 respectively, the upper and lower wings are able to move in a coordinated way by rotating about axes 130 and 133 respectively. This imposes a motion on wheel upright 100, which motion is essentially a rotation about axis 136 ("camber axis") joining points 132 and 135. By suitable arrangement of the design to fix axes 130, 131, 133 and 134, points 132 and 135 can be fixed so that the camber axis is in a desired location. The running surface for the vehicle is tangential to opposite wheels of the vehicle at their lowest points. For the reasons discussed above, one useful location of the camber axis is below the running surface of the wheel, and generally parallel with both the running surface and the plane of rotation of the wheel. However, other design criteria could dictate a different location for the camber axis, and that could be accommodated by suitable design of the suspension components.

The joint 114 between the wings is configured, e.g. in location and range of motion, such that relative motion of the first and second wings imposes a velocity ratio between the motions (a) of the upper wing relative to the upper suspension arm at joint 109 and (b) of the lower wing relative to the lower suspension arm at joint 120. Since one of the suspension arm joints is above the other, that velocity ratio results in cambering of the wheel when the wings move relative to each other. The relationship of the axis of that camber motion to the rotation axis of the wheel can be fixed by the design of the hub carrier 100: specifically by it rigidly connecting the wheel hub and the hub carrier's interconnections to joints 113 and 122 in an appropriate way.

In one example mechanism, when the vehicle undergoes bump travel mounting points 109 and 120 will move substantially vertically by rotation about joints 107. This can be achieved by the suspension arms 101, 102 being of equal or substantially equal length. Since only one of those parts (101, 102) that link points 109 and 120 to the body is damped by damper 108 relative to the body of the vehicle, the relative positions of the mounts 109 and 120 will be substantially unchanged by bump motion and such motion will not significantly affect the relative configuration of the wings 103, 104. Thus the wheel can move in bump at substantially constant camber. In another example mechanism, one of the suspension arms can be significantly longer than the other. For instance, the lower suspension arm can be significantly longer than the upper suspension arm. This will cause bump travel to result in some camber variation of the wheel. The camber motion due to the camber mechanism provided by free relative motion of wings 103, 104 can be superimposed on that bump-dependent camber motion. The range of camber motion that can result from the camber mechanism is preferably greater than that that can result from bump travel. For example, the range of camber motion that can result from the camber mechanism can be greater than that that can result from bump travel by a factor of two, three or even four. As an illustration, the range of camber variation due to bump travel could be around 3°, whereas the range of camber variation due to the camber mechanism could be greater than 10°, for example around 14°.

When the vehicle undergoes steer inputs the inner end of track rod 111 will move laterally and its outer end at joint 110 will move accordingly. This will cause both wings 103, 104 to rotate about a steer or kingpin axis 180 running through the upper and lower suspension mounts 109, 120, without significantly affecting the relative configuration of the wings 103, 104. Thus the wheel can move in steer at substantially constant camber.

The purpose of camber control link 122 is to coordinate camber motion between corresponding wheels on opposite sides of the vehicle. The opposite wheel to the one illustrated can be mounted on a suspension mechanism that is a mirror image of the one shown in the figures. Camber control link 122 can then run from point 121 to the corresponding point on the opposite mechanism. As a result, those opposite wheels will be constrained to move in a coordinated manner, one moving towards increasing negative camber when the other moves towards increasing positive camber. Although satisfactory results can be had from permitting opposite wheels to move independently in camber, with no camber control link, linking opposite wheels in this way has the advantage that they will not adopt uncoordinated attitudes due to differences of relief or friction in the road surface between the inside and outside of a bend, or as a consequence of different cornering forces at opposing contact patches due to vehicle weight transfer in roll. The camber link 121 could be attached to either the upper or the lower wing or to the wheel upright. If it is attached to a wing then it is preferably attached at a location remote from the wing axis 130/133 of the wing to which it is attached (in order that it does move relative to the vehicle in camber). To achieve coordinated motion of opposite wheels, the camber control link is best attached to the suspensions of opposite wheels at cognate points. To achieve the best mechanical effect, it is preferably attached at points that undergo substantial motion in camber. To avoid substantial cross-coupling of steering motions, it is preferably attached at points near the respective steer axes 180 of the wheels. Thus, in the example shown in the figures, joint 121 is provided on the lower link at a point overlying the lower suspension arm mount 120. It could be provided on the upper link at a point underlying the upper suspension arm mount 109. The camber link could be a rigid rod extending laterally across the vehicle from one suspension to the other. Alternatively, it could be provided by a compound linkage, or an electro-mechanical or hydraulic mechanism that transmits force from one suspension to the other. The camber link could optionally be constrained relative to the body of the vehicle by a camber control mechanism. That mechanism could constrain an inboard portion of the camber link to translate only in a lateral direction relative to the body of the vehicle. It could, for example, be a channel 122a attached to the body of the vehicle and through which the camber link passes.

This mechanism permits the hub carrier to move relative to the mounts 109, 120 (or relative to the body of the vehicle for constant bump travel) only in steer, by rotation about the steer axis through mounts 109 and 120, and in camber by rotation about the camber axis 136. Other rotation and translation of the hub carrier relative to the mounts 109, 120 is prevented.

This design can be implemented in such a way as to have a number of advantages over prior designs. First, the components located between the suspension arms and the hub carrier can be of a sufficiently small size and light weight that they can be packaged in a vehicle of conventional dimensions. Second, the joints between the components can readily be implemented using readily available parts. Third, the motion between the components can be made geometrically pure, or approximately so, and as a result the behaviour of the system can be relatively tolerant of manufacturing imperfections.

In the first embodiment, freedom of relative motion of the upper and lower wings and the hub carrier is got through translation at joints 113 and 122. In a second embodiment, those joints could instead be revolute joints and the joint 114 could be provided by an element that permits additional relative motion of the wings. Such a joint could be one that permits relative shear and rotation at the desired joint centre, but with little or no relative motion in a direction substantially lateral to the vehicle. The joint could, for example, be an elastomeric joint. An element joining the wings at that joint could, for example, be an arm attached to each wing by a respective spherical joint. Alternatively it could be an elastic and/or flexible member attached at one point on itself to wing 103 and at another point on itself to wing 104. Such an element would preferably be relatively small so that its points of attachment to both wings remain close to joint 110 to the track rod. Such an element could be a rubber bush. Alternatively, the wings could be interlinked at 114 by a mechanism such as a pair of bevelled gear segments, one attached to one wing and one to the other, and intermeshing so that the desired relative motion of the wings is permitted.

The track rod 111 could be attached to either wing, but is preferably located so that: (i) in the case of the track rod being attached to the upper wing, an axis through joints 120 and 110 passes through or near point 132 or (ii) in the case of the track rod being attached to the lower wing, an axis through joints 109 and 110 pass through or near point 135.

Joint 114 can usefully lie on or close to a line joining the intersection point of axes 130 and 133 and the intersection point of axes 131 and 134, assuming those pairs of axes are coplanar.

It will be appreciated that some deviation from various preferred aspects of the mechanism's alignment can be tolerated without significantly impacting performance. For example, axes 133 and 134 could be non-coplanar but still both pass through a small zone near the desired camber axis. Similarly, axes 130 and 131 could be non-coplanar but still both pass through a small zone near the desired camber axis. In general, minor deviations from the most preferred configurations will not be detectable by a driver (or possibly only by a very expert driver), and such variations can be tolerable in a system for a practical vehicle. Thus a variation from a most preferred configuration can be considered insubstantial if its effects cannot be appreciated by a driver of ordinary skill for the vehicle in question.

To implement a suspension design of the type shown in the figures, the following steps could be taken.

1. Determine the desired steer axis.
2. Decide on the location of the camber axis. Preferably the camber axis will intersect the steer axis. For the reasons discussed above, the camber axis is usefully below the road surface. The preferred distance of the axis below the road surface will depend on the desired vehicle characteristics but for a typical sports car the camber axis could usefully be 60 to 200 mm, more preferably 90 to 130 mm, below the road surface. Conveniently the camber axis is parallel or substantially so with the road surface, but it could deviate from that plane. Conveniently the camber axis is parallel or substantially so with the rotation plane of the wheel, as defined by its hub, but it could deviate from that plane.
3. Decide on the position of the track rod end joint 110 relative to the steer axis so as to achieve a desired relationship between travel of the steering rack and degree of steer, and so that axis 130, which is defined by the top suspension arm joint 109 and track rod end joint 110, intersects the desired camber axis. This will define point 132.
4. Decide on the attitude of axis 131. Axis 131 runs through point 132. It is conveniently at an angle of from 5° to 30° relative to axis 130. Conveniently, the plane in which axes 130 and 131 lie is such as to permit joint 113 to be packaged compactly inboard of the wheel.
5. Decide on the attitude of axis 134. Axis 134 intersects the camber axis at a point 135. Axis 134 is conveniently at an angle of from 5° to 30° relative to axis 133. Conveniently, the plane in which axes 133 and 134 lie is such as to permit joint 122 to be packaged compactly inboard of the wheel.
6. Decide on the location of joint 114. The joint 114 preferably lies on or close to a line joining the intersection of axes 130 and 133 and the intersection of axes 131 and 134. The structure of the upper wing could be adapted to permit this intersection to be at a convenient location to meet packaging constraints.
7. The camber control link 122 can then be attached at a location that is insensitive to steer but sensitive to camber motion. For example, joint 121 could intersect or be relatively near the steer axis, but relatively remote from the wing axis (130, 133) of the wing to which it is attached.

Axes 131 and 134 could conveniently lie in or substantially in a common plane, although they need not do so. Conveniently axes 131 and 134 will be at an appreciable angle to one another. This angle may be greater than 45°. This angle may be greater than 70°. This angle may be greater than 80°. This angle may be approximately 90°.

The track rod may serve to set the rotation axis of the wing to which it is attached, so that for fixed steer input that wing is free to rotate relative to the body of the vehicle about an axis through its mount 109, 120 to the suspension and the joint between it and the track rod.

For illustration, the distance between each of points 132 and 135 and the centre of the wheel may be less than the diameter of the wheel. Preferably those points are on either side of a vertical plane containing the axis of the wheel bearing (i.e. the wheel's rotation axis).

The camber axis is preferably orthogonal or substantially so to the wheel's rotation axis.

If the vehicle's body is suspended from the camber mechanism by multi-links rather than suspension arms, the links from the body to the upper wing can be attached to the upper wing by respective spherical joints on or substantially on axis 130, and the links from the body to the lower wing can be attached to the lower wing by spherical joints on or substantially on axis 133.

The relationships between bump and steer and between camber and steer can be tuned by choosing the location of the steering rack, in particular its height.

In the mechanism shown in the figures joints 112 and 113 are constituted by hinges that each comprise a pair of stub pins which extend from the wheel carrier coaxially with the hinge axis; and a pair of circular bearing holders fast with the respective wing, each of which embraces a respective one of the stub pins. The two stub pins of each joint 112, 113 face in the same direction, so each wing can be mated to the wheel carrier through a purely linear motion, simply by slotting its bearing holders onto the appropriate stub pins of the wheel carrier. Disengagement of a wing from the stub pins is positively resisted in one direction (the direction in which the wing is engaged on the stub pins) by the mounts that attach the stub pins to the body of the wheel carrier. There is no need for the joints themselves to positively resist disengagement of the wing from the stub pins in the other direction, so one end of the stub pins can remain open as shown in the figures. After the wings have been engaged on the stub pins, the other joints (109, 120, 114) are made and those connections prevent the wings from disengaging from the stub pins. Configuring the joints 112, 113 in this way makes it very convenient to assemble the mechanism. There could be just a single stub pin for each joint 112, 113 provided that pin was sufficiently strong to constrain the joint as required.

The wheel illustrated in the figures is a steerable wheel. An analogous arrangement could be applied to a non-steerable wheel by grounding the inboard end of track rod 111 so that it is fixed relative to the vehicle body. In this way, all the wheels of a vehicle could have camber freedom using a mechanism as illustrated in the figures.

The mechanism described above permits individual wheels, or pairs of wheels if camber link 122 is used, to move freely in camber, without resistance from the camber mechanism. The wheel will have a neutral position which it will naturally adopt with the vehicle at rest on a horizontal surface and in the absence of external forces. The camber mechanism described above can present no resistance to motion of the hub carrier in camber relative to the body of the vehicle from its neutral position. In this arrangement the attitude of the wheel in camber is determined by the lateral force acting through the contact patch(es) and generating a moment about the camber axis (axes), and by the shape of the tyre profile(s). A tyre having a flattened profile may tend to promote a neutral camber position whereas a tyre having a more rounded profile may be more sensitive to lateral forces. The cambering effect will also be partly offset by the mass of the cambering mechanism's components, and by precession effects from the rotating wheel and tyre. Since a typical road tyre has a somewhat flattened outer profile, for such a tyre it may be unnecessary to provide any mechanical means for urging the system to neutral camber. However, such means could be provided if desired, for example by way of a spring attached to the camber control link 122. It may be desirable to have the ability to lock the camber motion, in which case means such as a mechanically or electrically operated latch could be provided to lock the camber control link 122 relative to the vehicle body.

A typical vehicle has a wheelarch which is an arched structure set into the flank of the vehicle, and lined by panels that define the radially outer extent of the wheelarch. When such a vehicle is equipped with a camber/suspension mechanism as described above, preferably the wings 103, 104 are located within the wheelarch. Due to the restricted space in a typical wheelarch, which would constrain the size of the wings 103, 104, there could be the possibility that components of the mechanism would foul each other at the extremes of their motions. To cope with this, pads could be attached to one or more components, potentially including the vehicle's bodywork, at the locations where they might make contact. Alternatively, stops could be fitted to the camber link and/or the steering mechanism to limit their motion. Depending on the type of motion that might give rise to components clashing, the stops could limit the lateral motion of the camber link relative to the vehicle body and/or relative to the position of the steering rack.

The camber link could be configured in such a way that it can deflect resiliently in a vertical direction when the suspension undergoes bump travel. To achieve this, vertical travel and/or axial rotation of the inboard part of the camber link could be restrained relative to the body of the vehicle. For instance, if the camber link extends between opposite wheels then a central part of the camber link, mid-way between the opposing wheels, could pass through a laterally-directed channel that is fast with the vehicle. The camber link itself, or at least the outboard part(s) of it could be flexible, for example in the manner of a leaf, beam or torsion spring. Flexion of the camber link when the suspension deflects in bump could then serve as springing for urging the suspension to return to a neutral position. The inboard part of the camber link can be restrained relative to the body of the vehicle so that it can transmit camber motion from one wheel to its opposing wheel, but cannot transmit bump motion from one wheel to its opposing wheel.

It is desirable that when the vehicle is not cornering the wheels adopt a default position towards the centre of their camber motion. This means there is scope for them to increase or decrease camber angle depending on the direction in which the vehicle next turns. When the wheel is a driven wheel the torque applied through the wheel can affect the tendency of the wheel to adopt a central position. That torque can be harnessed to help restore the wheel to a default camber position. The default position is conveniently one that is at or near the centre of the wheel's camber travel in the sense that the wheel can deviate substantially (e.g. by at least 5° or alternatively by at least 10°) from that position in both positive and negative camber. Examples of such measures, which may be employed individually or in any combination, are as follows.

1. The suspension may be configured such that near or substantially at a default camber position there is a maximum of the forward position of the hub centre as a function of camber angle. The said maximum may be a maximum over the entire range of camber motion of the wheel, or over the part of that motion that includes a central zone of the wheel's camber travel. The central zone may, for example be the central 50% or 80% of the wheel's camber travel. The maximum may be the maximum attained within 2%, 5%, 10% or more of camber angle deviation from the centre of the wheel's camber motion. The maximum may be the maximum attained within 2%, 5%, 10% or more of camber angle deviation from the wheel's default camber position.

2. The suspension may be configured so that near or substantially at a default camber position there is a maximum of the rearward position of the contact patch of the tyre of the wheel as a function of camber angle. The said maximum may be a maximum over the entire range of camber motion of the wheel, or over the part of that motion that includes a central zone of the wheel's camber travel. This criterion may be assessed with the brake of the wheel in question unlocked or, more preferably, locked. The central zone may, for example be the central 50% or 80% of the wheel's camber travel. The maximum may be the maximum attained within 2%, 5%, 10% or more of camber angle deviation from the centre of the wheel's camber motion. The maximum may be the maximum attained within 2%, 5%, 10% or more of camber angle deviation from the wheel's default camber position. The position of the tyre contact patch may, for example, be taken to be the geometric centre of the contact patch.

These characteristics may imply that the suspension should cause the wheel's caster angle to increase with camber as the camber angle deviates away from the central or default position.

The contact patch of the vehicle and/or its centre may be assessed when the vehicle is in any normal operational state, but conveniently when the vehicle's tyres are properly inflated, the vehicle is stationary and the vehicle's mass is its mass in running order in accordance with 1230/2012/EC.

It is helpful for the suspension to be configured so that camber motion causes negligible change in height of the vehicle body and/or negligible change of loading of any elastic elements such as springs acting vertically between the wheel and the vehicle body. This avoids the suspension being urged to a particular camber configuration by the mass of the vehicle or the bias of suspension springing.

Figure 4:
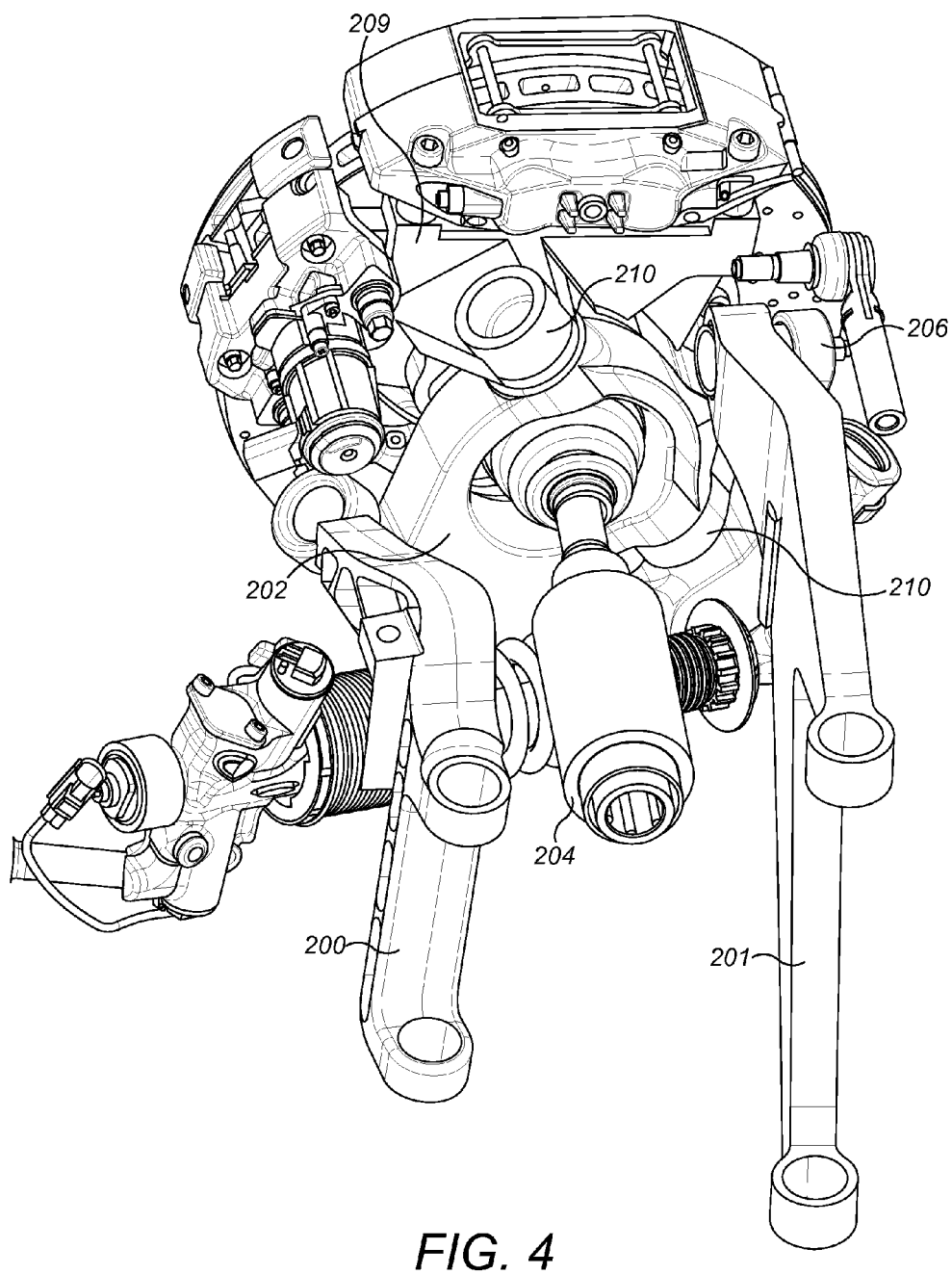
FIGS. 4 and 5 show an alternative suspension system.
Figure 5:
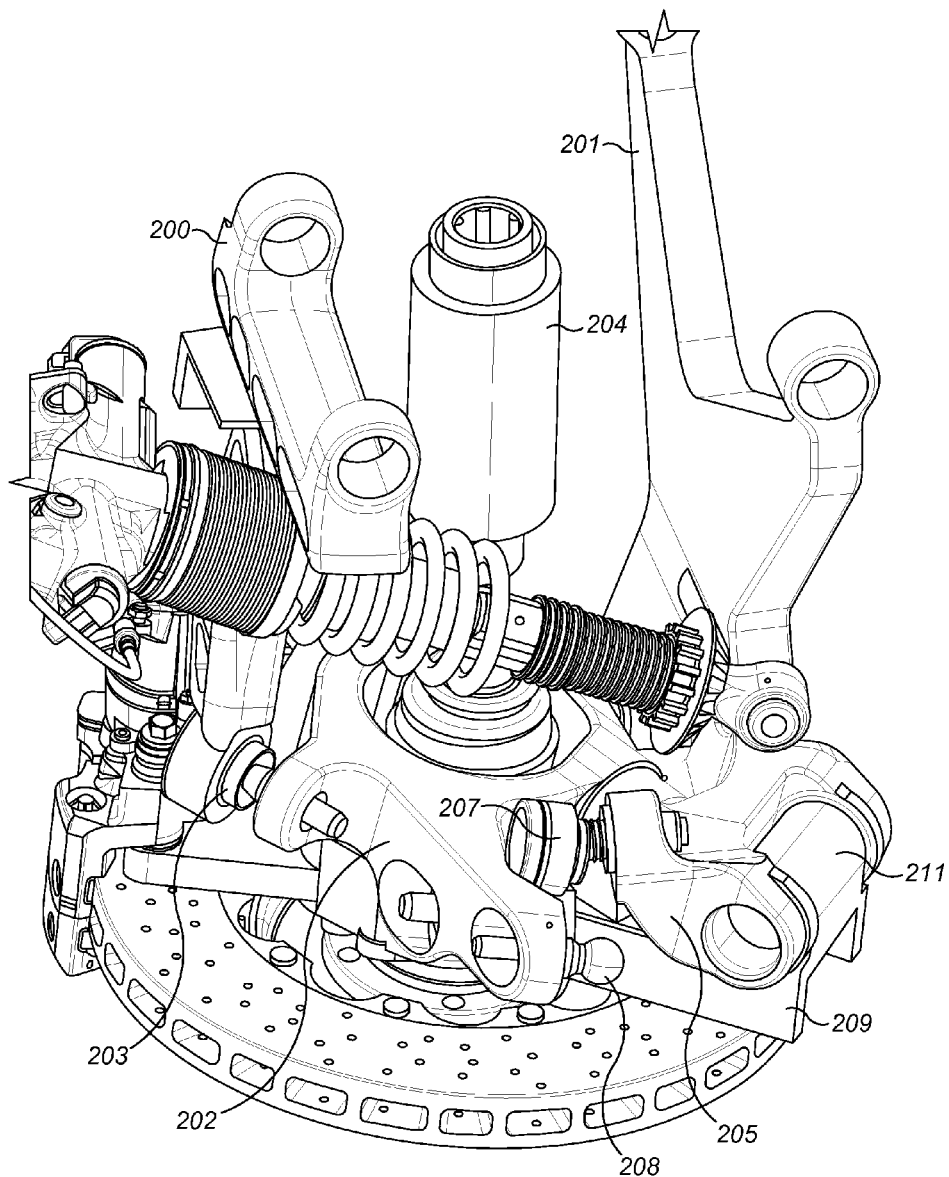

FIGS. 4 and 5 show an example of a suspension system for a driven wheel. In this example it is a system for a driven non-steerable wheel, e.g. a rear wheel in a typical vehicle design. However, the geometry features provided by the design of FIGS. 4 and 5 could be provided in a suspension system for a steerable wheel.

The system of FIGS. 4 and 5 comprises upper and lower suspension wishbones 200, 201. These are pivoted to the vehicle body at their inboard ends about substantially longitudinal axes. A first wing member 202 of generally annular form is attached by a spherical joint 203 to the outer end of the upper wishbone 200. The first wing member encircles a drive shaft 204 which can carry drive torque to a wheel borne by the suspension mechanism. A second wing member 205 is attached by spherical joint 206 to the outer end of the lower wishbone 201. The first and second wing members are interlinked by a small link member 207 which is connected to each one by a respective spherical joint. A knuckle 208 on the wing member 202 permits a track rod to be attached thereto. The trackrod can run to the body of the vehicle. A wheel carrier 209 is attached to the first wing member 202 by a first revolute joint 210, with attachments on either side of the central hole in the first wing member, and to the second wing member by a second revolute joint 211. The wings, the link member and the wheel carrier are each rigid bodies. The wheel is mounted by a bearing to the wheel carrier. The link member 207 lies in or very close to a plane in which the wing members generally lie. With this design, there can be essentially no axial motion on the wing axes.

By suitable selection of the directions of the axes of joints 210, 211 and the spatial relationships between the joints of the wings to the wishbones and the wings to the link, and the length of the link, e.g. employing principles described above, this design of suspension can be made to have the properties that around the centre of camber travel:

a. the hub centre is at its most forward position; and
b. the centre of the wheel's contact patch (with locked brake) is at its most rearward position. Thus the lower part of the wheel carrier is at its rear-most position around the centre of camber travel.

The wheel has minimum caster substantially at the central or default camber position. Preferably, under camber motion there is minimal vehicle body jacking in both directions of camber travel from the central or default camber position: for example less than 10 mm of jacking.

Figure 6:
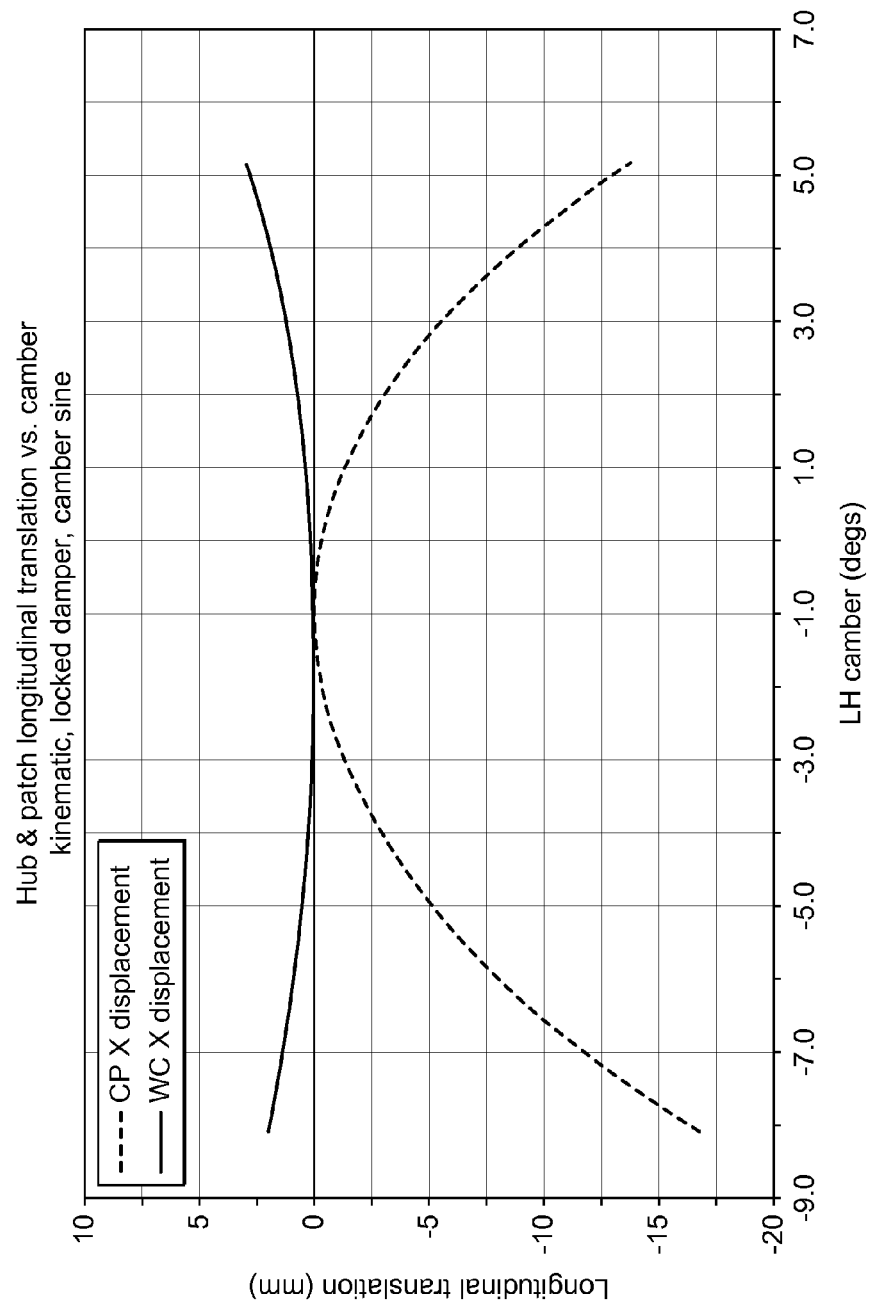
FIG. 6 is a graph showing the behaviour of the suspension system of FIGS. 4 and 5.

The desired behaviour is illustrated in FIG. 6. FIG. 6 shows a graph of the wheel's contact patch displacement in the X axis of the vehicle (lower curve) and wheel centre displacement in the X axis of the vehicle (upper curve) as a function of camber angle. If can be seen that they reach a maximum and a minimum respectively within 2.0 or 2.5 degrees of the zero camber position, and within 1.0 or 1.5 degrees of the −1.0 degree camber position, which may be the centre or neutral camber position for the vehicle.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A vehicle having a hub carrier coupled to a body of the vehicle by a camber mechanism, the vehicle having first and second mounting points by means of which the camber mechanism is coupled to the body of the vehicle, wherein:
   (i) the camber mechanism comprises:
   a first wing attached to the first mounting point by a first rotationally free joint;
   a second wing attached to the second mounting point by a second rotationally free joint and attached to the first wing by an inter-wing joint that permits relative motion of the first and second wings; and
   a tie link attached by a third rotationally free joint to the first wing and running to the vehicle body;

(ii) the hub carrier is attached to the first wing by a first hub carrier joint permitting relative rotation of the first wing and the hub carrier about only a single axis, which axis substantially intersects a camber axis;

(iii) the hub carrier is attached to the second wing by a second hub carrier joint permitting relative rotation of the second wing and the hub carrier about only a single axis, which axis substantially intersects the camber axis; and (iv) the inter-wing joint and the first and second hub carrier joints provide freedom of motion such that the hub carrier can camber relative to the vehicle body about the camber axis.

2. A vehicle as claimed in claim 1, wherein second rotationally free joint is a spherical joint.

3. A vehicle as claimed in claim 1, wherein the inter-wing joint and the first and second hub carrier joints provide freedom of motion such that the only permitted motions of the hub carrier relative to the first and second mounting points are:
 (a) cambering relative to the vehicle body about the camber axis; and
 optionally (b) steering relative to the vehicle body about an axis running between the first and second mounting points.

4. A vehicle as claimed in claim 3, wherein the first wing can rotate relative to the first mounting point about a first wing rotation axis passing substantially through the first rotationally free joint and between the camber axis and the axis of the first hub carrier joint.

5. A vehicle as claimed in claim 1, wherein the first wing can rotate relative to the first mounting point about a first wing rotation axis passing substantially through the first rotationally free joint and between the camber axis and the axis of the first hub carrier joint where the camber axis and the axis of the first hub carrier joint are closest.

6. A vehicle as claimed in claim 5, wherein the second wing can rotate relative to the second mounting point about a second wing rotation axis passing substantially through the second rotationally free joint and between the axis of the second hub carrier joint and the camber axis.

7. A vehicle as claimed in claim 5, wherein the first wing rotation axis passes substantially through the third rotationally free joint.

8. A vehicle as claimed in claim 5, wherein the first rotationally free joint is defined by multilinks.

9. A vehicle as claimed in claim 8, wherein the first wing rotation axis passes substantially through the third rotationally free joint.

10. A vehicle as claimed in claim 1, wherein the second wing can rotate relative to the second mounting point about a second wing rotation axis passing substantially through the second rotationally free joint and between the axis of the second hub carrier joint and the camber axis where the camber axis and the axis of the second hub carrier joint are closest.

11. A vehicle as claimed in claim 10, wherein the first wing can rotate relative to the first mounting point about a first wing rotation axis passing substantially through the first rotationally free joint and between the camber axis and the axis of the first hub carrier joint where the camber axis and the axis of the first hub carrier joint are closest; and wherein the inter-wing joint is located adjacent an axis joining (a) the point of closest approach of the first wing axis and the second wing axis and (b) the point of closest approach of the axis of the first hub carrier joint and the axis of the second hub carrier joint.

12. A vehicle as claimed in claim 11, wherein a part of the tie rod is translationally fast with a steering mechanism whereby it can be moved relative to the body of the vehicle in response to steering inputs.

13. A vehicle as claimed in claim 1, wherein a part of the tie rod is translationally fast with the body of the vehicle.

14. A vehicle as claimed in claim 1, wherein a part of the tie rod is translationally fast with a steering mechanism whereby it can be moved relative to the body of the vehicle in response to steering inputs.

15. A vehicle as claimed in claim 1, wherein the first rotationally free joint is a spherical joint.

16. A vehicle as claimed in claim 1, comprising a suspension mechanism whereby the vehicle can be suspended from the first and second mounting points in such a way as to permit bump travel of the camber mechanism relative to the body of the vehicle.

17. A vehicle as claimed in claim 16, wherein the vehicle can be suspended from at least one of the wings by means of at least two multilinks.

18. A vehicle as claimed in claim 1, wherein the first and second hub carrier joints are cylindrical joints and the inter-wing joint is a spherical joint.

19. A vehicle as claimed in claim 1, wherein the camber mechanism presents no resistance to motion of the hub carrier in camber relative to the body of the vehicle from its neutral position.

20. A vehicle as claimed in claim 1, comprising a wheel attached to the hub carrier and wherein the camber axis is located below the running surface of the wheel.

21. A vehicle as claimed in claim 1, wherein the camber mechanism is such that the wheel is able to move in camber substantially independently of bump and steer during normal motion of the vehicle.

22. A vehicle as claimed in claim 1, further comprising a second hub carrier coupled to the body of the vehicle in the manner set out in claim 1, the first and second hub carriers being interlinked so as to coordinate their motion in camber.

23. A vehicle as claimed in claim 22, wherein the first and second hub carriers are interlinked by a camber control mechanism connected between one wing attached to one of the hub carriers and one wing attached to the other of the hub carriers.

24. A vehicle as claimed in claim 23, wherein the camber control mechanism is attached to each of the said wings at a respective point substantially on an axis between the respective first and second mounting points.

25. A vehicle as claimed in claim 24, wherein the camber control mechanism is a strut rigid for transmission of force axially along the strut.

26. A vehicle as claimed in claim 23, wherein the camber control mechanism is a strut rigid for transmission of force axially along the strut.

27. A vehicle as claimed in claim 23, wherein the camber control mechanism is resiliently flexible in response to bump motion of each hub carrier.

28. A vehicle as claimed in claim 23, wherein the camber control mechanism presents no resistance to coordinated motion of the hub carriers in camber relative to the body of the vehicle from their neutral positions.

29. A vehicle as claimed in claim 23, wherein the camber control mechanism presents resistance to camber, which resistance is in relation to its velocity relative to the vehicle body.

30. A vehicle as claimed in claim 23, wherein the camber control mechanism is capable of urging the wheel to alter its camber position.

31. A vehicle as claimed in claim 1, wherein the axis of the first hub carrier joint and the axis of the second hub carrier joint are coplanar.

32. A vehicle as claimed in claim 1, wherein at least one of the first and second hub carrier joints is constituted by a hinge structure that in itself resists relative axial translation of the parts coupled by the joint in only one direction.

33. A vehicle having a hub carrier coupled to a body of the vehicle by a camber mechanism, the vehicle having first and second mounting points by means of which the camber mechanism is coupled to the body of the vehicle, wherein the camber mechanism comprises:
  a first wing rotatably attached to the first mounting point;
  a second wing rotatably attached to the second mounting point; and
  a first hub carrier joint attaching the hub carrier to the first wing, the first hub carrier joint permitting relative rotation of the first wing and the hub carrier about only a single axis, which axis substantially intersects a camber axis;
  a second hub carrier joint attaching the hub carrier to the second wing, the second hub carrier joint permitting relative rotation of the second wing and the hub carrier about only a single axis, which axis substantially intersects the camber axis; and
  an inter-wing joint coupling the first wing and the second wing together;
  wherein one of the first and second mounting points is located above the other, and the inter-wing joint is configured such that relative motion of the first and second wings imposes a velocity ratio between motions at the first and second mounting points whereby the hub carrier can camber relative to the vehicle body about the camber axis.

34. A vehicle as claimed in claim 33, comprising a wheel attached to the hub carrier and wherein the camber axis is located below the running surface of the wheel.

35. A vehicle as claimed in claim 34, wherein the first and second hub carrier joints are cylindrical joints.

36. A vehicle as claimed in claim 33, wherein the first and second hub carrier joints are cylindrical joints.

37. A vehicle as claimed in claim 36, wherein the inter-wing joint is a spherical joint attached on the one hand to the first wing and on the other hand to the second wing.

38. A vehicle as claimed in claim 36, wherein the first wing is rotatably mounted to the first mounting point by a spherical joint and/or the second wing is rotatably mounted to the second mounting point by a spherical joint.

39. A vehicle as claimed in claim 33, wherein the inter-wing joint is a spherical joint attached on the one hand to the first wing and on the other hand to the second wing.

40. A vehicle as claimed in claim 33, wherein the first wing is rotatably mounted to the first mounting point by a spherical joint and/or the second wing is rotatably mounted to the second mounting point by a spherical joint.

41. A vehicle as claimed in claim 33, wherein the first mounting point and/or the second mounting point is/are linked to the body of the vehicle by wishbones.

42. A vehicle as claimed in claim 33, comprising a linkage extending between at least one of the wings and the body of the vehicle for constraining the motion of the wheel in camber.

43. A vehicle as claimed in claim 33, further comprising a second hub carrier coupled to the body of the vehicle in the manner set out in claim 28, the first and second hub carriers being interlinked so as to coordinate their motion in camber.

44. A vehicle as claimed in claim 43, wherein the first and second hub carriers are interlinked by a camber control mechanism connected between one wing attached to one of the hub carriers and one wing attached to the other of the hub carriers.

45. A vehicle having a hub carrier coupled to a body of the vehicle by a mechanism, the vehicle having first and second mounting points by means of which the mechanism is coupled to the body of the vehicle, wherein the mechanism comprises:
  a first wing rotatably attached to the first mounting point;
  a second wing rotatably attached to the second mounting point; and
  a first hub carrier joint attaching the hub carrier to the first wing, the first hub carrier joint permitting relative rotation of the first wing and the hub carrier about only a single first axis;
  a second hub carrier joint attaching the hub carrier to the second wing, the second hub carrier joint permitting relative rotation of the second wing and the hub carrier about only a single second axis, the first and second axes deviating from each other by at least 45°; and
  an inter-wing joint coupling the first wing and the second wing together;
  wherein one of the first and second mounting points is located above the other, the inter-wing joint is configured such that relative motion of the first and second wings imposes a velocity ratio between motions at the first and second mounting points, and the first and second hub carrier joints are cylindrical joints.

46. A vehicle as claimed in claim 45, wherein the body of the vehicle is suspended from the mechanism by the first and second mounting points.

47. A vehicle as claimed in claim 46, wherein the first and second mounting points are capable of moving relative to the body of the vehicle in bump.

48. A vehicle as claimed in claim 45, wherein the hub carrier is capable of moving in camber relative to the body of the vehicle by virtue of relative motion of the wings.

* * * * *